United States Patent
Smela et al.

(10) Patent No.: US 6,936,955 B1
(45) Date of Patent: Aug. 30, 2005

(54) CONJUGATED POLYMER ACTUATOR RESPONSIVE TO ELECTRICAL STIMULATION

(75) Inventors: Elisabeth Smela, Silver Spring, MD (US); Mark W. Tilden, Los Alamos, NM (US); Benjamin R. Mattes, Santa Fe, NM (US)

(73) Assignee: Santa Fe Science and Technology, Inc., Santa Fe, NM (US)

( * ) Notice: Subject to any disclaimer, the term of this patent is extended or adjusted under 35 U.S.C. 154(b) by 0 days.

(21) Appl. No.: 09/918,293

(22) Filed: Jul. 30, 2001

Related U.S. Application Data

(60) Provisional application No. 60/223,442, filed on Aug. 4, 2000.

(51) Int. Cl.$^7$ .......................... H02N 2/00; H02N 11/00
(52) U.S. Cl. ...................... 310/800; 310/363; 310/300
(58) Field of Search ............................... 310/363, 800

(56) References Cited

U.S. PATENT DOCUMENTS

| | | | | |
|---|---|---|---|---|
| 5,177,330 A | * | 1/1993 | Takahashi et al. | 200/5 A |
| 5,556,700 A | * | 9/1996 | Kaneto et al. | 252/500 |
| 5,869,007 A | * | 2/1999 | Jang | 422/82.02 |
| 6,161,382 A | * | 12/2000 | Brotz | 60/528 |
| 6,245,262 B1 | * | 6/2001 | Varaprasad et al. | 264/1.31 |
| 6,249,076 B1 | * | 6/2001 | Madden et al. | 310/363 |
| 6,545,384 B1 | * | 4/2003 | Pelrine et al. | 310/309 |
| 6,555,945 B1 | * | 4/2003 | Baughman et al. | 310/300 |
| 6,583,533 B2 | * | 6/2003 | Pelrine et al. | 310/309 |
| 6,628,040 B2 | * | 9/2003 | Pelrine et al. | 310/307 |

FOREIGN PATENT DOCUMENTS

| | | | | |
|---|---|---|---|---|
| GB | 2287030 A | | 9/1995 | .......... C08G 73/02 |
| JP | 2000-1338540 A | * | 5/2000 | ........... H01L 41/09 |
| WO | WO99/24991 | | 5/1999 | ............ H01B 1/12 |

OTHER PUBLICATIONS

Sequoia, Elservier, "Electrical studies of Polyaniline and its application,"*Synthetic Metals*, vol. 18, pp. 365-370, 1987.

Lewis, T.W.; Spinks, G.M.; Wallace, G.G., "Development of an all polymer electromechanical actuator,"*Intelligent Polymer Research Institute*, pp. 520-521, 1996.

Sansinena, J.M., Olazabal, V., Otero, T.F., Polo da Fonscca, C.N., De Paoli, Marco-Λ., "A solid state artificial muscle based on polypyrrole and a solid polymeric electrolyte working in air,"*Chem Community*, pp. 2217-2218, 1997.

Okuzaki, H., Kunugi, T., "Rapid Communicatioin, Electronically induced contraction of Polypyrrole film in ambient air,"*Electronically Induced contraction of Film*, pp. 1591-1594.

Adams, P.N., Devasagayam, P., Pomfret, S.J., Abell, L., Monkman, A.P., "A new acid processing route to polyaniline films which exhibit metallic conductivity and electrical transport strongly dependent upon intrachain molecular dynamics,"*Journal of Physics: Condense*, pp. 8293-8303, 1998.

\* cited by examiner

*Primary Examiner*—Tom M. Dougherty
(74) *Attorney, Agent, or Firm*—Samuel M. Freund; Cochran Freund & Young LLC

(57) ABSTRACT

A conjugated polymer actuator having attached electrodes is described wherein direct electrical stimulation induces changes in the dimensions and mechanical properties thereof without the need for electrolytes or counter electrodes.

4 Claims, 7 Drawing Sheets

CONJUGATED POLYMER ACTUATOR RESPONSIVE TO ELECTRICAL STIMULATION

CROSS REFERENCE TO RELATED APPLICATIONS

The present application claims the benefit of Provisional Application Ser. No. 60/223,442 which was filed on Aug. 4, 2000.

FIELD OF THE INVENTION

The present invention relates generally to electroactive polymer actuators and, more particularly, to conjugated polymer actuators responsive to direct electrical stimulation through electrodes. Portions of this invention were made with government support under Contract No. MDA972-99-C-0004 awarded by the U.S. Defense Advance Research Agency to Santa Fe Science and Technology, Inc. The government has certain rights in the invention.

BACKGROUND OF THE INVENTION

Actuators are capable of changing form or shape in response to a stimulus or condition and, thus, to effect a transformation or action. Actuation is accomplished by, motors, piezoelectric devices, ion-exchange resins, and shape memory alloys, as examples. There is a need for reducing the weight of actuators, for reducing the noise associated with actuators, for reducing the currents and voltages required for their operation, and for increasing the strains that can be achieved. In general, actuators which are light-weight and make smooth motions are desired.

Recent advances in the actuator field relate to the use of polymers as constituents of actuator devices. Of particular interest are those polymeric systems that operate in an electromechanical mode; that is, which convert an electrical signal to a mechanical motion. One class of materials used for actuation is the family of conjugated polymers. Typical examples are polyaniline and polypyrrole. It was previously thought that in these materials volume change was a phenomenon that required mass transport. For example, under electrochemical stimulation, ions and solvents are exchanged between the conjugated polymer and its external environment. In the absence of such exchange, neither electrochemistry nor volume change occur. See, for example, "Electrochemical Studies Of Polyaniline And Its Application" by K. Okabayashi et al., Synth. Meth. 18, 365 (1987).

Electrochemical stimulation; that is, oxidation and reduction, of a conjugated polymer requires a counter electrode and an electrolyte. An electrolyte is either a liquid or a solid that contains ions. Oxidation and reduction of the conjugated polymer, which is the working electrode, is accompanied by other chemical reactions at the counter electrode. The working and counter electrodes are electrically insulated by the electrolyte, which is conductive through ion migration, but not electrically conductive.

Solid state versions of electrochemical actuators have been demonstrated in the laboratory. See, e.g., "Development Of An All Polymer Electromechanical Actuator" by T. W. Lewis et al., Polym. Prep. 38, 520 (1997), which teaches use of a gel electrolyte consisting of a mixture of propylene carbonate and ethylene carbonate solvents in polyacrylonitrile where in order to avoid loss of these solvents over time, the actuator would have to be sealed, and "A Solid State Artificial Muscle Based On Polypyrrole And A Solid Polymeric Electrolyte Working In Air" by J. M. Sansinena et al., Chem. Commun. 1997, page 2217 where a solid polymer electrolyte, poly(epichlorohydrin-co-ethylene oxide) is used. However, the muscle was found not function when the room-temperature humidity dropped below 60%. Furthermore, this type of device exhibited mechanical problems arising from poor adhesion between the conjugated polymer and the polymer or gel electrolyte. In these devices, a second conjugated polymer component usually acts as the counter electrode.

In "Electrically Induced Contraction Of Polypyrrole Film In Ambient Air" by H. Okuzaki and T. Kunugi, J. Polym. Sci. B 36, 1591 (1998), conjugated polymer actuators not based on electrochemical reactions are described. Polypyrrole was heated by driving a current though it which resulted in the loss of water molecules, causing the polypyrrole to contract. Upon cooling, the polypyrrole expanded as it reabsorbed water molecules from the environment.

Therefore, in order to achieve actuation using electrochemical conjugated polymer actuators present devices require a source of ions from a liquid electrolyte or from a solid polymer or gel electrolyte. This adds to the complexity of the device, and in order to avoid loss of water or solvent, the device must be sealed. For applications in certain environments, such as outer space, the requirement for water or solvents and the difficulty of sealing the device precludes their use. Conjugated polymer actuators based on driving water in and out of the polymer using heat generated by an electrical current, likewise cannot be used in low-humidity environments or for applications in outer space. Furthermore, the characteristics of such actuators, including the initial and final sizes as well as speed of response, are dependent on the ambient humidity.

Accordingly it is an object of the present invention to provide a conjugated polymer actuator responsive to electrical stimulation.

Another object of the present invention is to provide a conjugated polymer actuator responsive to electrical stimulation that does not require an electrolyte medium and a counter electrode.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the actuator hereof includes a conjugated polymeric material which expands when an electrical voltage is applied between two locations thereof and contracts when the electrical voltage is reduced or removed in the absence of conducting liquids, vapors or metal backing.

Preferably, the conjugated polymeric material includes doped polyaniline.

In another embodiment of the present invention in accordance with its objects and purposes, the method of actuation hereof includes the step of directly electrically stimulating a conjugated polymeric material at two locations thereof in the absence of conducting liquids or vapors.

Preferably, the conjugated polymeric material includes doped polyaniline.

Benefits and advantages of the invention include actuators that do not require electrolytes, counter electrodes, or sealing, but that can be directly used in the form of simple fibers or films. Such actuators are simple to manufacture, light weight, quiet, soft, and inexpensive and can function in the absence of any water or solvents, making them suitable for environments such as ambient air or outer space. The length of the actuators has been found to be proportional to the applied electrical voltage or current.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 7 shows a film of conjugated polymer used as an actuator, FIG. 7a illustrating current flowing through the sides of the film while

DETAILED DESCRIPTION

Briefly, the present invention includes a method of actuation and an actuator device comprising a conjugated polymeric material which expands when an electrical voltage is applied between two locations thereof in the absence of liquids, vapors or metal backing, and contracts when the electrical voltage is reduced or removed.

Figure 1:
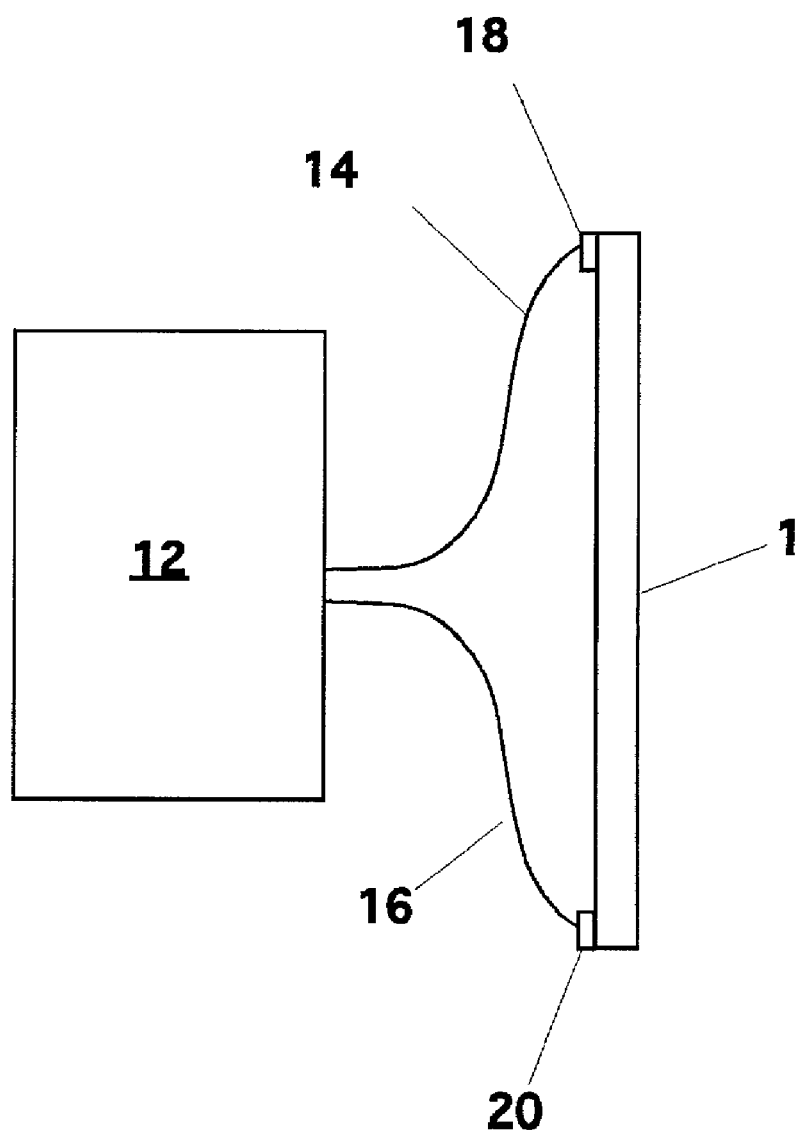
FIG. 1 is a schematic representation of the conjugated polymer actuator in electrical contact with a power supply.

Reference will now be made in detail to the present preferred embodiments of the invention examples of which are illustrated in the accompanying drawings. Identical callouts are used to identify similar or identical structure. Turning now to FIG. 1, polyaniline strip, 1, placed in electrical connection with power supply, 12, through electrical leads, 14 and 16, is schematically shown. Silver paint at locations 18 and 20, is utilized to establish electrical contact between wires 14 and 16 and strip 1, respectively. When a current is passed through the conjugated polymer member, the strip elongates and its Young's modulus decreases. The polyaniline strip used had dimensions approximately 0.4 mm×0.9 mm×4 mm.

The conducting polymer may be fabricated from monomers of anilines, pyrroles, thiophenes, and phenylene vinylenes and is preferably a homopolymer of these monomers (polyaniline, polypyrrole, polythiophene, polyphenylenevinylene). Derivatives of these monomers can also be employed as long as conducting polymers are generated therefrom. Such derivatives include the C1–C10 alkyl, C1–C10 alkoxy-, halo-, nitro-, cyano-, ester-, etc. substituted monomers, as examples, and are commercially available or can be made using known organic reactions. Mixtures of monomers may be used. Conjugated polymers from polyaniline and derivatives of polyaniline are preferred. Most preferred is polyaniline processed with AMPS as described in "A New Acid-Processing Route To Polyaniline Films Which Exhibit Metallic Conductivity And Electrical Transport Strongly Dependent Upon Intrachain Molecular Dynamics" by P. N. Adams et al., J. Phys.: Condens. Matter 10, 8293 (1998), the teachings of which are hereby incorporated by reference herein.

The polymer may have any thickness, such as between 1 A and 10 m, including all values therebetween. Thicker and thinner layers may be used. The polymer need not have a uniform thickness, and may have any form, including films and fibers. The preferred shape is a strip or a fiber, and fibers can be solid or hollow, although any shape may be used. The preferred thickness range is between 1 $\mu$m and 1 cm. The electrical leads may be commercially available wires. Methods for connecting the leads to the polymer are well known and include silver paint, carbon paint, low-temperature solder, clips, crimps, and clamps. To ensure mechanical stability of the connections, glues and epoxies may also be used.

A. General Method for Producing PANI:

Polyaniline powder in the emeraldine base (EB) oxidation state and having a molecular weight greater than $10^5$ g/mol was used for preparing films and fibers following the method described in UK Patent 2287030, the teachings of which are hereby incorporated by reference herein.

B. General Method for Producing Fibers of PANI/AMPS:

Fibers were prepared according to the method set forth in WO 99/24991, the teachings of which are hereby incorporated by reference herein. EB (4.22 g) and AMPSA (5.78 g) were ground together for five min. in a mortar & pestle. The gray powder was then placed inside of a glove bag together with DCA (190 g), and the bag was filled with nitrogen gas. The powder was added gradually to the DCA solvent and homogenized as described above. The thick solution was then sealed in what is known to those skilled in the art as a dope pot, and transferred to a fiber spin line. A nitrogen pressure of 100 psi was applied to one end of the dope pot. The other end of the dope pot was attached to a gear pump. The pumped spin solution was passed through 240 and 140 $\mu$m filters before being extruded through a 250 $\mu$m diameter spinneret into a 2-butanone coagulation bath. The nascent fiber was removed after approximately ten min., allowed to dry overnight, and subsequently stretched over a hot pin at 90° C. Hollow fibers as well as solid fibers can be produced by this method.

C. General Method for Measuring Length Change:

For force and length change measurements, an Aurora Scientific Inc. dual-mode lever arm system, model 300B, was used. The instrument measured both the position of the arm and the force required to maintain a fixed position, allowing both isotonic and isometric measurements to be performed. For isotonic measurements, a fixed force was applied to the conjugated polymer sample, and the arm position, corresponding to sample length, was recorded. The position was measured as a function of applied potential. For isometric measurements, a fixed arm position was maintained, and the force exerted by the sample on the arm was measured. The system could also be used to measure the Young's modulus of the sample.

Figure 2:
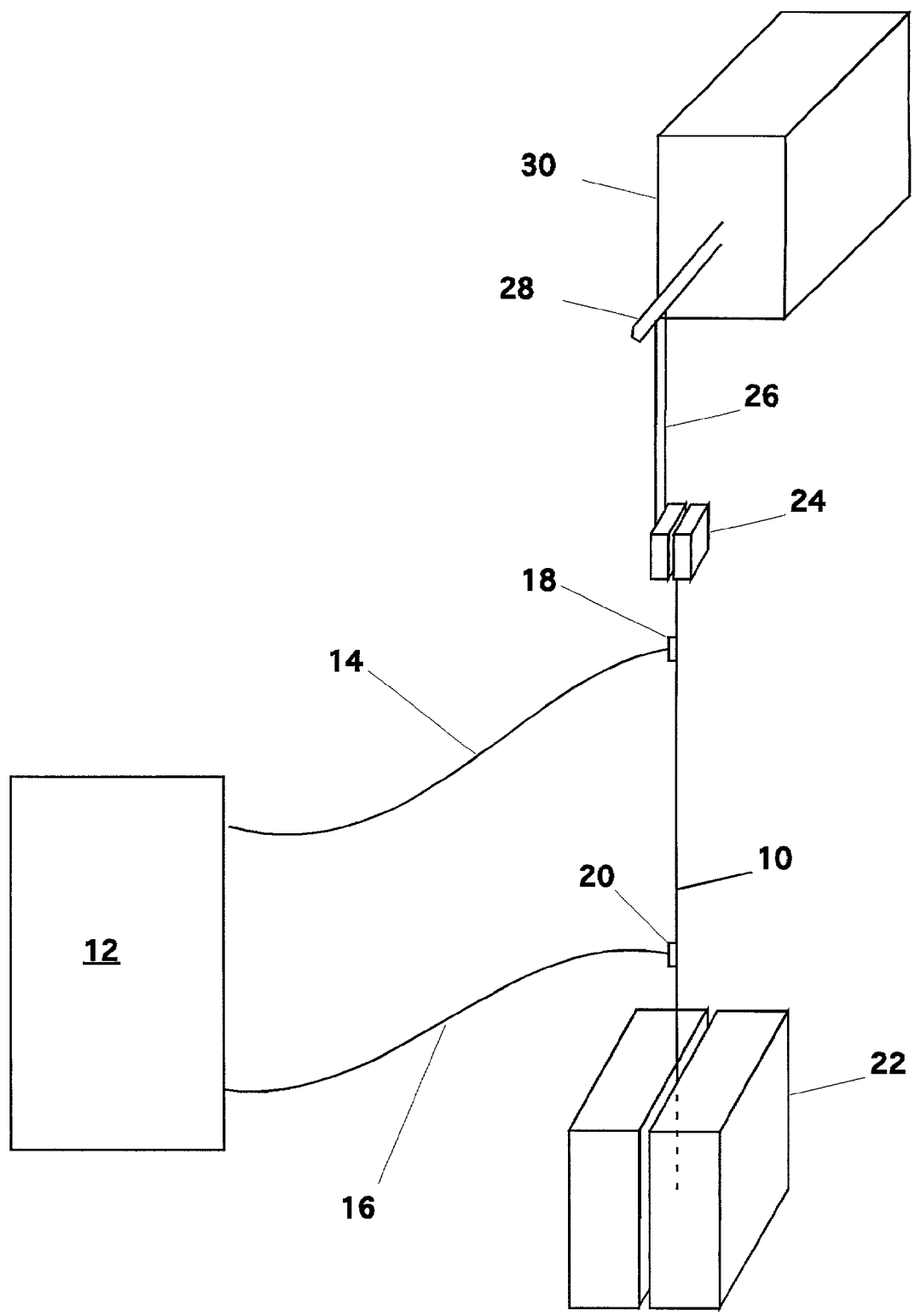
FIG. 2 is a schematic representation of the apparatus used for measuring the mechanical properties and behavior of the conjugated polymer actuator.

FIG. 2 is a schematic representation showing polyaniline fiber, 10, held between bottom clamp, 22, and a top clamp, 24. Electrical leads, 14 and 16, were attached to the sample 10 using silver paint at positions 18 and 20, respectively, and to voltage supply 12. Top clamp 24 was attached to lever arm, 28, of the model 300B measurement system, 30, using two nylon threads, 26. Nylon threads 26 were affixed closer to the pivot point of lever arm 28 than recommended by the manufacturer, which led to an error in the recorded length, which should have been slightly larger; the length changes reported herein are correct to within a factor of 1.5. The Young's modulus values given hereinbelow for the conjugated polymer fiber have not been corrected for the stretching of the nylon fibers during the measurement. These values have also not been adjusted for the incorrect positioning of the nylon threads. The measured values are too small, but are correct to within a factor of 2.

Having generally described the invention, the following EXAMPLES provide additional detail.

EXAMPLE 1

A. Isotonic Measurement of Length Change of PANI/AMPS During Electrical Stimulation:

A PANI/AMPS hollow fiber having a wall thickness of approximately 400 μm was produced using the method described hereinabove. The fiber was cut into a strip approximately 0.9 mm wide and 4 cm long. Two multistrand Cu wires were attached to the strip using silver paint. After the silver paint had dried, cyanoacrylate adhesive (super glue) was placed over the silver paint to increase the mechanical integrity of the joint. The separation between silver painted areas on the strip was 22 mm. The resistance of the strip measured between the electrodes using an ohmmeter was ~120 Ω. After the paint had dried, the strip was clamped at the bottom and affixed to the mechanical measurement arm at the top. The length of the strip between clamps was 3.4 cm. A 5 g constant tensile load was applied to the strip, and the arm position was measured. The electrodes were connected to a 12 V power supply that was adjustable in increments of 1.5 V.

Figure 3:
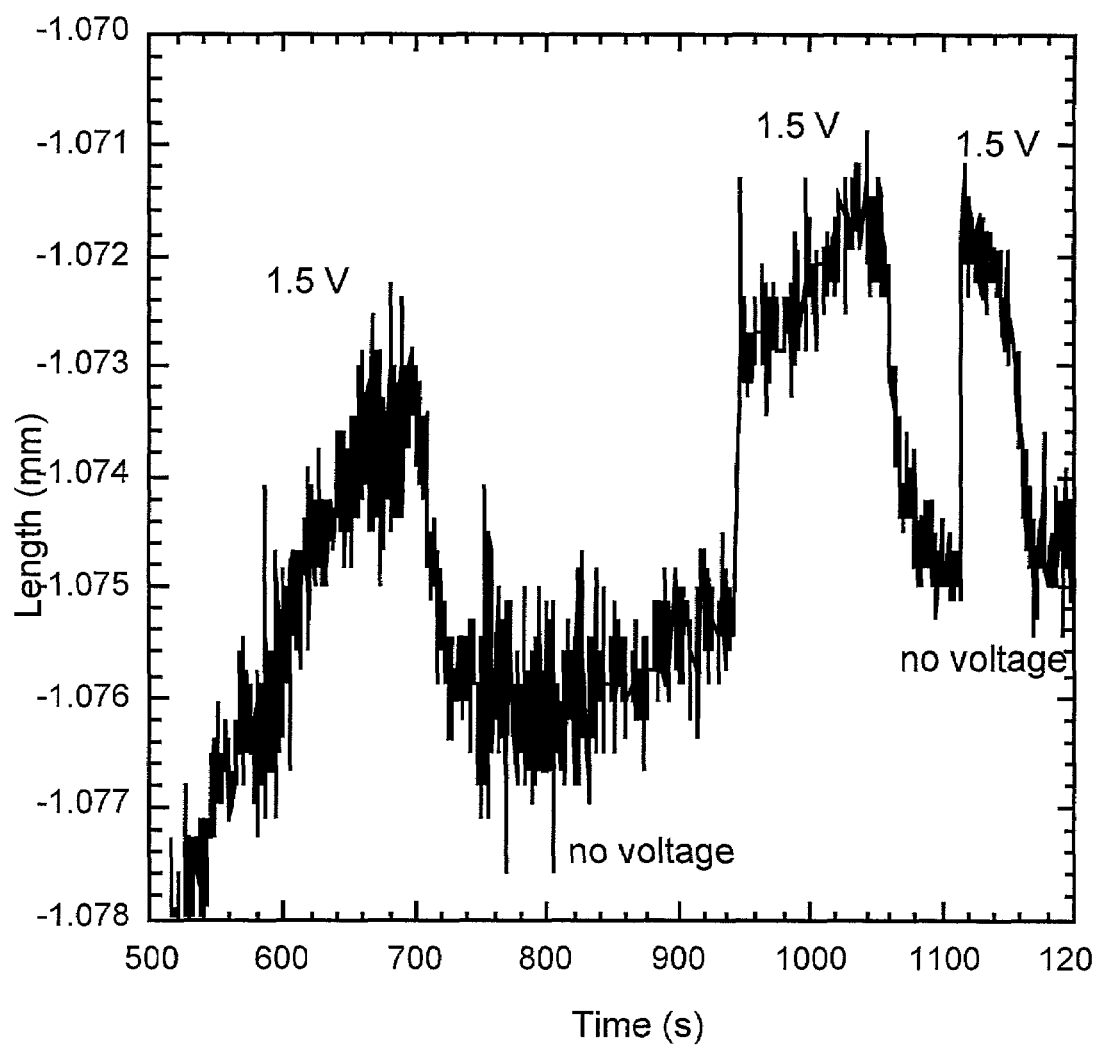
FIG. 3 shows the isotonic (5g) length change of a polyaniline strip upon the application of a dc voltage of 1.5 V (~12 mA).

At a voltage of 1.5 V, the polyaniline sample was found to elongate by ~0.027mm as shown in FIG. 3. The strain, using the length between electrodes, was 0.027/22=0.13%. Note that the distance between electrodes was the active distance used, and the assumption was made that the portion of the strip through which no current passes is inactive. When the voltage was removed, the sample contracted. It should be mentioned that the fact that the sample elongated upon the application of the voltage is proof that the observed effect cannot be the result of desorption of water vapor from the polymer.

Figure 4:
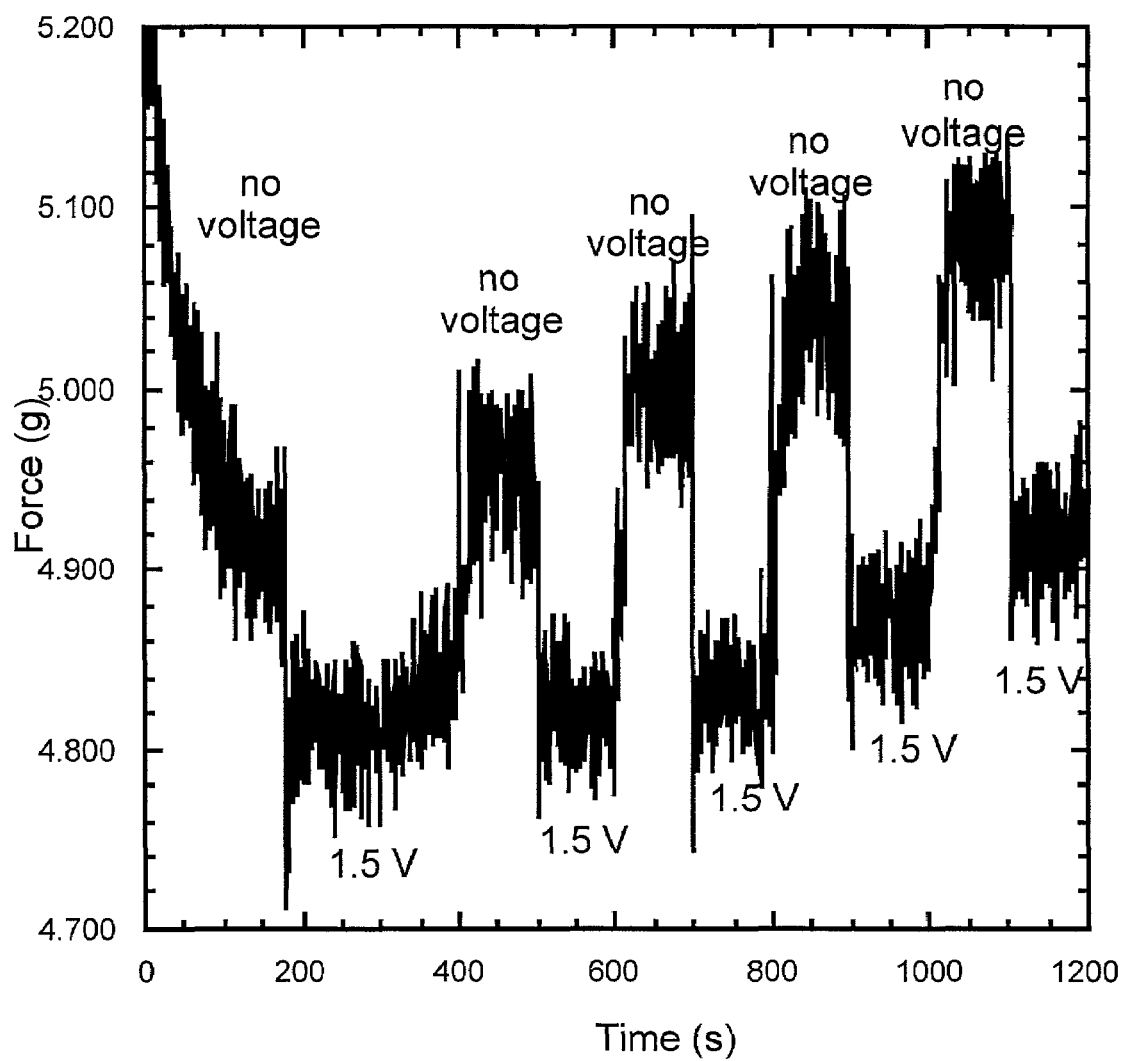
FIG. 4 shows the isometric change in force exerted by a polyaniline strip upon the application of a dc voltage of 1.5 V (~12 mA).
Figure 5:
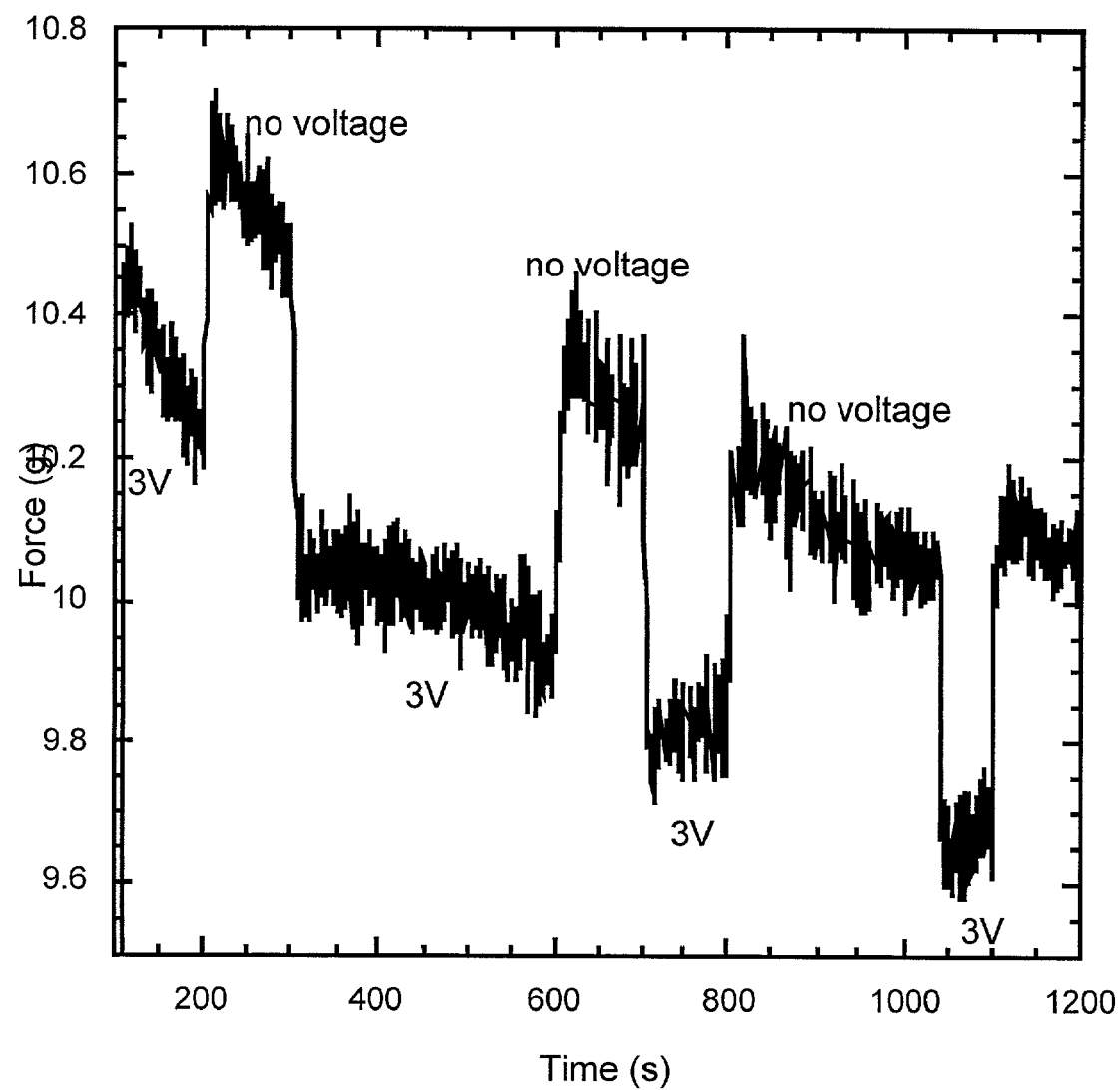
FIG. 5 shows the isometric change in force exerted by a polyaniline strip upon the application of a dc voltage of 3 V (~24 mA).

B. Isometric Measurement of Force Change of PANI/AMPS During Electrical Stimulation:

For the same sample and experimental conditions described for the isotonic measurement hereinabove, the arm position was instead held constant and the force on the arm was measured. For an applied voltage of 1.5 V, the force decreased by approximately 0.16 g as shown in FIG. 4. For an applied voltage of 3 V, the force decreased by approximately 0.41 g as shown in FIG. 5. Thus, the greater the voltage, the greater the force difference.

EXAMPLE 2

Figure 6:
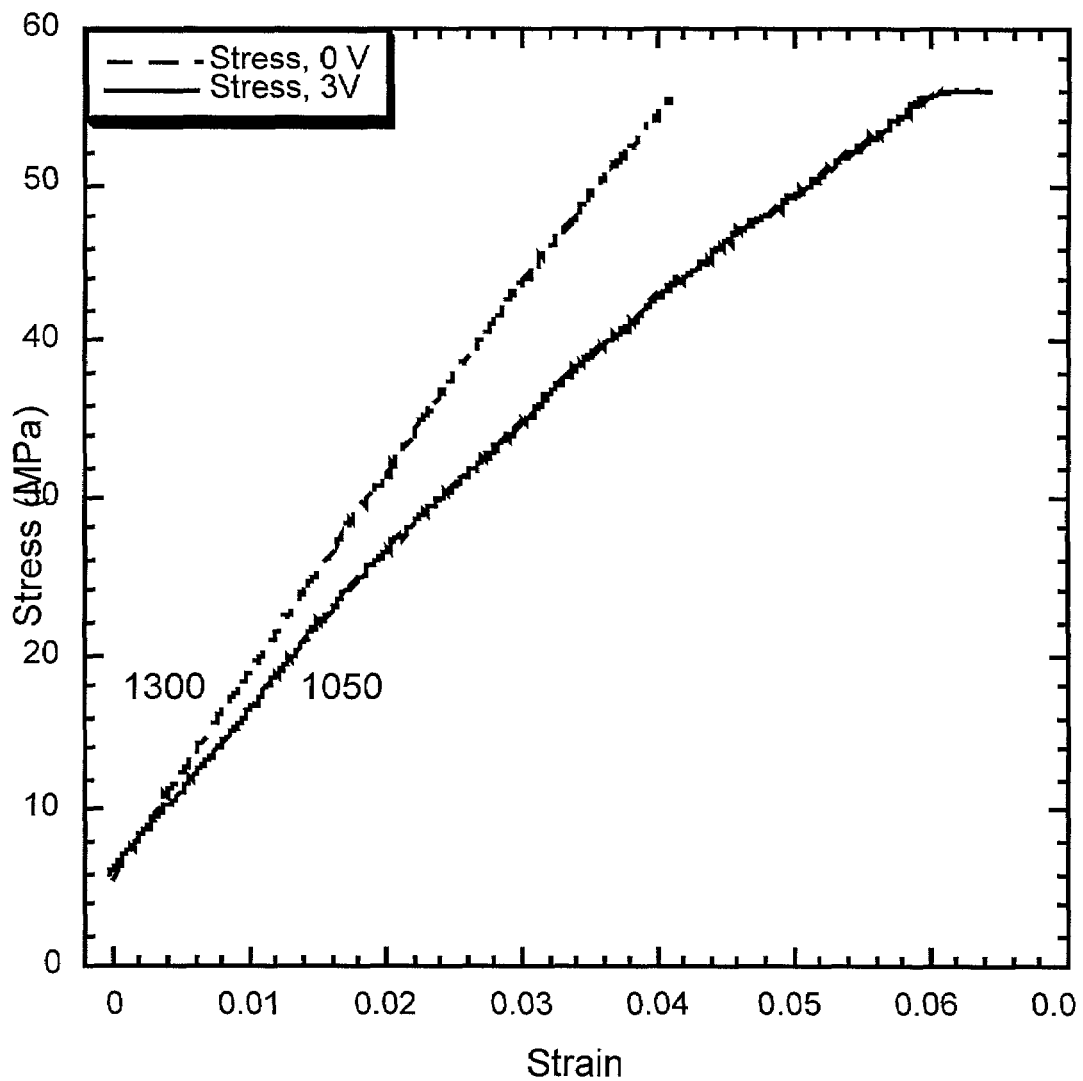
FIG. 6 shows stress vs. strain curves for a polyaniline fiber approximately 105 $\mu$m in diameter and 4 cm long with and without 3 V applied voltage. Young's moduli for the two cases are shown adjacent to the curves in MPa.

Measurement of Young's Modulus of PANI/AMPS During Electrical Stimulation:

A PANI/AMPS solid fiber with a diameter of approximately 105 μm was produced using the method described above. The fiber was cut into a strip approximately 0.9 mm wide and 4 cm long, and two, single-strand Al wires were attached to the strip using silver paint. After the silver paint had dried, cyanoacrylate adhesive (super glue) was placed over the silver paint to increase the mechanical integrity of the joint. The separation between silver painted areas on the strip was 26 mm. The resistance of the strip measured between the electrodes using an ohmmeter was ~700 Ω. After the adhesive had dried, the strip was clamped at the bottom and affixed to the mechanical measurement arm at the top. A 5 g constant tensile load was applied to the arm, and the arm position was then raised at a rate of 0.02 mm/sec to increase the elongation of the fiber. The stress (force in N divided by fiber cross-sectional area) was measured as a function of strain (change in length divided by the original length). The electrodes were connected to a 12 V power supply that was adjustable in increments of 1.5 V. Without an applied voltage, the sample had a Young's modulus of approximately 1300 MPa. With an applied voltage of 3 V, the Young's modulus decreased to approximately 1050 MPa as shown in FIG. 6. When the applied voltage was removed, the Young's modulus returned to 1300 MPa. FIG. 6 also shows stress vs. strain curves for a polyaniline fiber approximately 105 μm in diameter and 4 cm long with and without 3V applied. Young's moduli for the two cases are shown adjacent to the curves in MPa.

The foregoing description of the invention has been presented for purposes of illustration and description and is not intended to be exhaustive or to limit the invention to the precise form disclosed, and obviously many modifications and variations are possible in light of the above teaching.

Figure 7A:
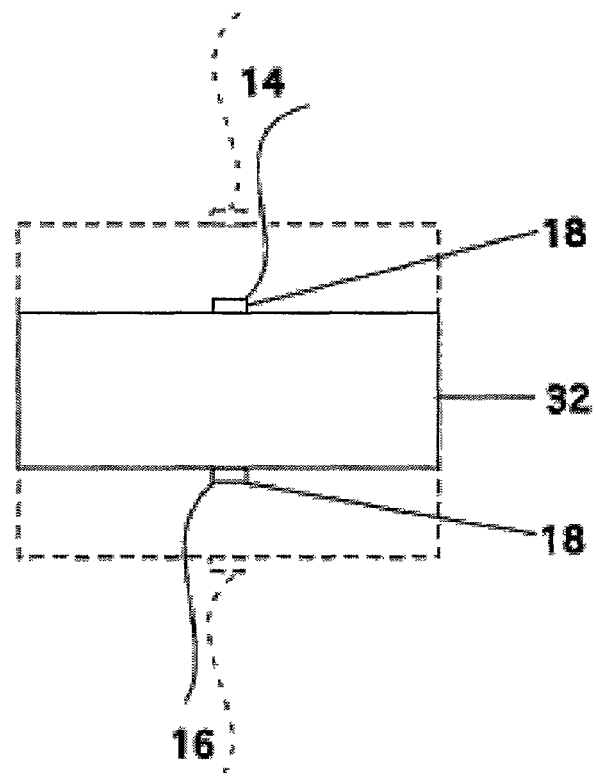
Figure 7B:
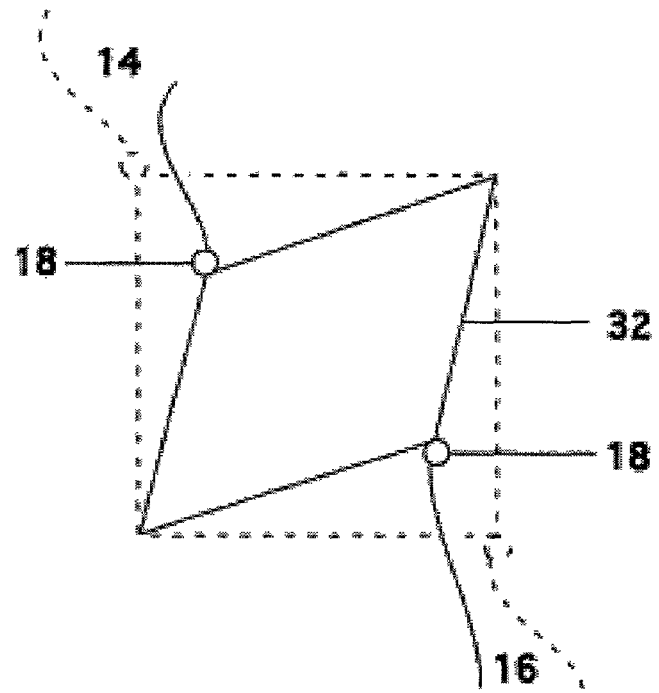
FIG. 7b illustrates current flowing through the corners thereof.

For example, an ac voltage may also be used to stimulate the length change and the changes in mechanical properties of the polyaniline. Other current shapes can also be considered, such as triangle waves or square waves. Multiple conjugated polymer fibers may be bundled together to magnify the force generated. A conjugated polymer film may also be used as an actuator. Depending upon how one applies the voltage or current to the film, the sample will change shape along different axes. This is schematically illustrated in FIG. 7a and FIG. 7b hereof. The thickness of free-standing films or films deposited on substrates could also be changed using electrical stimulation.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An actuator having at least one surface having a larger area than other surfaces thereof and consisting of a conjugated polymeric material, whereby said material expands when an electrical voltage is applied between two locations thereof and contracts when the electrical voltage is reduced, neither of the two locations being coextensive with the at least one surface having a larger area.

2. The actuator as described in claim 1, wherein said conjugated polymeric material comprises doped polyaniline.

3. A method of actuation comprising the step of directly electrically stimulating a conjugated polymeric material having at least one surface having a larger area than other surfaces thereof at two locations thereof, neither of the two locations being coextensive with the at least one surface having a larger area.

4. The method of actuation as described in claim 3, wherein said conjugated polymeric material comprises doped polyaniline.

* * * * *